United States Patent
Certain

(10) Patent No.: US 10,150,569 B2
(45) Date of Patent: Dec. 11, 2018

(54) METHOD OF STOPPING A ROTORCRAFT ENGINE IN OVERSPEED, AND A SYSTEM AND A ROTORCRAFT ASSOCIATED THEREWITH

(71) Applicant: AIRBUS HELICOPTERS, Marignane (FR)

(72) Inventor: Bernard Certain, Ain en Provence (FR)

(73) Assignee: Airbus Helicopters, Marignane (FR)

(*) Notice: Subject to any disclaimer, the term of this patent is extended or adjusted under 35 U.S.C. 154(b) by 346 days.

(21) Appl. No.: 14/867,464

(22) Filed: Sep. 28, 2015

(65) Prior Publication Data
US 2016/0090187 A1 Mar. 31, 2016

(30) Foreign Application Priority Data
Sep. 26, 2014 (FR) .................................. 14 02172

(51) Int. Cl.
*F02C 9/28* (2006.01)
*B64D 31/06* (2006.01)
(Continued)

(52) U.S. Cl.
CPC ............. *B64D 31/06* (2013.01); *B64D 27/10* (2013.01); *F02C 3/10* (2013.01); *F02C 9/263* (2013.01);
(Continued)

(58) Field of Classification Search
CPC . F01D 21/02; F02C 9/28; F02C 9/263; B64D 31/06
(Continued)

(56) References Cited

U.S. PATENT DOCUMENTS 3,899,879 A * 8/1975 Downing ................... F02C 9/32
137/489.5
6,321,525 B1 * 11/2001 Rogers ...................... F01D 17/06
60/39.281
(Continued)

FOREIGN PATENT DOCUMENTS

EP 0092502 10/1983
EP 2570617 A1 * 3/2013 ............. F01D 21/02
(Continued)

OTHER PUBLICATIONS

English Translation: Hilario, European Patent Publication EP 2570617 A1, Mar. 20, 2013, European Patent Office (Year: 2013).*
(Continued)

*Primary Examiner* — Nadeem Odeh
(74) *Attorney, Agent, or Firm* — Brooks Kushman P.C.

(57) ABSTRACT

A method of stopping an engine of a rotorcraft in overspeed, the engine comprising a gas generator and a power assembly. When the engine is in operation, a relationship is established giving a limit derivative that varies as a function of the speed of rotation of the power assembly. The speed of rotation, referred to as the "current speed", reached by the power assembly is measured and the time derivative of the speed of rotation is determined and referred to as the "current derivative". The engine is stopped automatically when the limit derivative corresponding to the current speed as determined by the relationship is less than or equal to the current derivative.

16 Claims, 2 Drawing Sheets

(51) Int. Cl.
*B64D 27/10* (2006.01)
*F02C 9/26* (2006.01)
*F02C 9/46* (2006.01)
*F02C 3/10* (2006.01)

(52) U.S. Cl.
CPC .................. *F02C 9/28* (2013.01); *F02C 9/46* (2013.01); *F05D 2270/021* (2013.01); *F05D 2270/042* (2013.01); *F05D 2270/304* (2013.01); *F05D 2270/52* (2013.01)

(58) Field of Classification Search
USPC ......................................................... 701/100
See application file for complete search history.

(56) References Cited

U.S. PATENT DOCUMENTS

| | | | |
|---|---|---|---|
| 6,729,138 | B2 | 5/2004 | Noussitou et al. |
| 2012/0116613 | A1 | 5/2012 | Daumas |
| 2013/0098042 | A1 | 4/2013 | Frealle et al. |
| 2013/0247577 | A1 | 9/2013 | Rossotto et al. |
| 2014/0123663 | A1 | 5/2014 | Ficklscherer |

FOREIGN PATENT DOCUMENTS

| | | |
|---|---|---|
| FR | 2962165 | 1/2012 |
| FR | 2967213 | 5/2012 |
| FR | 2980174 | 3/2013 |
| JP | H0466730 | 3/1992 |
| JP | 2004011459 | 1/2004 |
| WO | 0148574 A2 | 7/2001 |
| WO | 0148574 A3 | 2/2002 |
| WO | 2005119012 | 12/2005 |

OTHER PUBLICATIONS

French Search Report for French Application No. FR 1402172, Completed by the French Patent Office dated May 22, 2015, 6 Pages.

\* cited by examiner

METHOD OF STOPPING A ROTORCRAFT ENGINE IN OVERSPEED, AND A SYSTEM AND A ROTORCRAFT ASSOCIATED THEREWITH

CROSS REFERENCE TO RELATED APPLICATION

This application claims priority to French patent application No. FR 14 02172 filed on Sep. 26, 2014, the disclosure of which is incorporated in its entirety by reference herein.

BACKGROUND OF THE INVENTION (1) Field of the Invention

The present invention relates to a method of stopping an engine in overspeed, to an overspeed safety system, and to an aircraft including such an overspeed safety system.

The invention relates to the general technical field of systems that provide operating safety for aircraft engines, and in particular operating safety for a rotorcraft turboshaft engine.

The present invention relates more particularly to protecting a power plant in the event of an engine suffering overspeed.

(2) Description of Related Art

A rotorcraft includes at least one engine for rotating at least one rotor. Such a rotor provides said rotorcraft with at least part of its lift, or even its propulsion. By way of example, a twin-engined rotorcraft generally includes first and second engines acting together to drive a main rotor providing lift and/or also propulsion via a power drive train.

The first and second engines are generally controlled by respective first and second control units. Such control units are known by the acronym FADEC for "full authority digital engine control".

Each control unit may comprise a computer and peripheral monitoring and control units constituting interfaces between the cockpit and the associated engine of the aircraft.

The engines may be turboshaft engines.

A turboshaft engine conventionally comprises a gas generator. The gas generator comprises in succession at least one compressor, a combustion chamber, and at least one expansion turbine, the compressor being mechanically linked to the expansion turbine by a drive shaft.

In addition, the turboshaft engine comprises a power assembly located downstream from the gas generator. That power assembly is sometimes provided with at least one power turbine set in rotation by the outgoing gas leaving the gas generator. The power turbine rotates a drive shaft engaging with the power transmission train that is connected to a rotor.

The power turbine is said to be "free" when said turbine is not connected by a shaft to the gas generator.

In particular, in the event of the power transmission train breaking or in the event of a freewheel in the power train slipping, the speed of rotation of the free turbine of a turboshaft engine can increase considerably. As from a threshold, the person skilled in the art then considers that such a turboshaft engine is suffering overspeed, where such overspeed can lead to the speed of rotation of the engine running away and to the engine bursting.

Consequently, aircraft are generally provided with safety systems so as to try to limit the impact of such overspeed on the aircraft and its occupants.

A mechanical system for providing protection against blade-shedding may sometimes be used for an engine with a free turbine.

This mechanical system comprises a ring of shielding arranged around the free turbine. In addition, each blade of the free turbine is fastened to a hub by a fuse element.

Beyond a threshold speed of rotation, the fuse elements break. Each blade is then separated from the hub. However, these blades remain contained inside the engine as a result of the shield.

The ejection of the blades from the free turbine causes the speed of rotation of said free turbine to slow down, and thus makes it possible to stop overspeeding of the free turbine.

Nevertheless, the engine is partially destroyed as a result of the blades being ejected. Furthermore, stopping the rotation of a free turbine does not necessarily cause the gas generator of the engine to stop.

Consequently, an electronic shutdown system can be implemented to stop turboshaft engines in order to prevent overspeeding.

The manufacturer of a turboshaft engine then establishes for example a fixed threshold for the speed of rotation of the free turbine of said turboshaft engine. When that threshold is reached, the control unit stops the engine.

Document FR 2 962 165 suggests comparing only the engine torque transmitted by a free turbine with a torque threshold.

Nevertheless, the use of a single speed or torque monitoring threshold can cause untimely shutting down of the engine, e.g. when the rotorcraft performs a severe maneuver. Under such circumstances, such a monitoring system is sometimes not arranged on a single-engine aircraft.

On a multi-engine rotorcraft, engine shutdown can be inhibited in the event of another engine already being shut down because of overspeeding, in order to avoid untimely shutting down of the other engines. After a first engine has shut down, the stopping in flight of a second engine is then no longer authorized.

Under such circumstances, the second engine cannot, however, be stopped in the event of overspeeding. Such a situation is improbable, but not impossible. Consequently, if the second engine is subsequently in an overspeed condition, the second engine cannot be shut down automatically because its protection is inhibited. The second engine thus risks being in an overspeed situation.

In a variant, a pilot may then manually reset an electronic protection system against the overspeed of the second engine in order to avoid such a situation.

In this context, the turboshaft engine of a single-engine rotorcraft is sometimes fitted with a mechanical protection system of the "blade shedding" type.

However, a single-engine rotorcraft is not generally fitted with an electronic system for avoiding untimely shutting down of the only engine of the aircraft.

Multi-engine rotorcraft may however include a mechanical protection system of the "blade shedding" type for each engine, and an electronic shutdown system.

In addition, the technological background comprises a protection device that shuts down an engine in overspeed providing that a comparison is performed between a mechanical power required by the rotorcraft and a predefined power threshold. The mechanical power required by the rotorcraft is calculated depending at least on the current or anticipated value for the opposing torque of a main rotor of the rotorcraft.

Document FR 2 967 213 describes a method of controlling an overspeed safety system for an aircraft having at least two engines. That method consists in setting the overspeed safety system for the engines, in monitoring the speeds of rotation of the engines, in detecting overspeed on one of the engines, in shutting down the engine in question in the event of detecting overspeed, and in inhibiting the operation of the overspeed safety system for the other engine(s) still in operation. The overspeed safety systems of the engines still in operation can be reset as a function of one or more safety parameters.

Document FR 2 980 174 describes a method of controlling an overspeed safety system for an aircraft having at least two engines. In that method, a first engine is shut down when a monitoring parameter of said first engine exceeds a first threshold, and a second engine distinct from said first engine is shut down when the monitoring parameter of said second engine exceeds a second threshold, the second threshold being greater than said first threshold.

In particular, the monitoring parameter is the speed of rotation of the free turbine of a turboshaft engine.

Document WO01/48574 describes a regulator device for determining the sum of a speed of rotation of a rotor plus the product of a gain multiplied by the derivative of said speed of rotation. This sum is compared with a low threshold and a high threshold in order to determine whether the flow rate of fuel feeding an engine should be increased or reduced.

Document EP 0 092 502 describes a system determining a setpoint acceleration compared with a current acceleration of a turbine in order to control the fuel flow rate feeding an engine.

US document 2014/0123663 also describes a system aiming to control the fuel flow rate feeding an engine.

Those documents do not make reference to overspeed in engines.

Documents JP 2004 011459, JP H04 66730, and WO 2005 119012 are also known.

BRIEF SUMMARY OF THE INVENTION

The present invention thus aims to provide an alternative method firstly for avoiding the engines of an aircraft bursting as a result of overspeed in the engines, and secondly for limiting the risk of untimely shut down occurring.

The invention thus provides a method of stopping an engine of a rotorcraft in overspeed, said rotorcraft including at least one engine, the engine comprising a gas generator and a power assembly, the power assembly having at least one power turbine set in rotation by gas coming from the gas generator, the power assembly having at least one power shaft constrained to rotate with the power turbine, said power assembly being rotatable about a longitudinal axis at a speed referred to as the "speed of rotation".

The method comprises:
prior to a flight, a relationship is determined that provides a time derivative of said speed of rotation, referred to as a "limit derivative", over at least one range of speeds of rotation, the limit derivative according to said relationship being a function of the speed of rotation and varying as a function of said speed of rotation; and
during a flight:
the speed of rotation reached by the power assembly is measured, and referred to as the "current" speed;
the time derivative of said speed of rotation is determined, and referred to as the "current" derivative; and
when the current speed is located in a said range specified by said relationship, said engine is stopped automatically when the limit derivative corresponding to the current speed in application of said relationship is less than or equal to the current derivative.

Unlike prior art suggesting that the speed of rotation of the power assembly should be compared with a fixed value, the invention proposes establishing a relationship providing a limit time derivative of said speed of rotation as a function of the speed of rotation, i.e.

$$DL=f(N2)$$

where "DL" represents said limit derivative, "N2" represents the speed of rotation, and "f( )" represents said relationship.

The relationship may be established by calculation or by using tests and operating experience for example.

According to this relationship, the limit derivative can vary as a function of the speed of rotation.

Under such circumstances, the relationship is implemented on the rotorcraft.

In flight, a current speed is determined at each instant by taking measurements and performing calculations at a relatively high repetition rate, of the order of several tens of times per second, for example.

In parallel, the current derivative is determined at each instant. By way of example, the current derivative is determined at a given instant t by using the value of the current speed at that given instant t, and the value of the speed of rotation as measured at the measurement instant t−1 preceding said given instant.

When the current speed lies in a range specified by the implemented relationship, the engine is stopped if the current derivative is greater than or equal to the limit derivative obtained by applying said relationship on the basis of the current speed.

This condition can tend to limit the risk of untimely shut down of the engine, while providing a trigger threshold that can be reached relatively quickly, for example following breakage of the power transmission train connecting the engine to a rotor.

In the prior art, a manufacturer would compare the speed of rotation of the power assembly with a constant. However, the speed of rotation can increase significantly during a severe maneuver of the rotorcraft without the engine reaching overspeed requiring it to be stopped. Under such circumstances, a threshold that is too low may induce untimely stopping of the engine during a severe maneuver of the rotorcraft. On the contrary, a threshold that is too high may cause stopping to occur too late.

Using a limit derivative with a value that is not constant and that is a function of the speed of rotation tends to optimize the procedure for automatically stopping the engine.

Under such circumstances, this method is equally suitable for implementing on a multi-engine rotorcraft or on a single-engine rotorcraft.

On a single-engine rotorcraft, protection of the "blade shedding" type is advantageous in order to avoid an overspeeding engine bursting. However, the casing of the engine may be locally ripped open following deformation of the ring of the "blade shedding" type protection system or following a crash. Since the gas generator remains in operation, hot gas is able to escape from the ripped open engine and risks setting fire to oil or to fuel, for example.

The method claimed makes it possible to shut down the engine when overspeed is detected. Consequently, the gas generator is stopped and that may tend to reduce the risk of fire after a crash, for example.

On a multi-engine rotorcraft, the method may tend to limit the risks of untimely shut down of an engine. Under such circumstances, the rotorcraft need not necessarily be provided with a cross inhibition system that could potentially, in rare cases, maintain an engine in overspeed in operation.

This method may also include one or more of the following characteristics.

Thus, the gas generator is fed by a fuel metering device, said metering device is suitable for being set between a minimum limit inducing a minimum fuel flow rate and a maximum limit inducing a maximum fuel flow rate, and said engine is stopped automatically by setting the fuel-metering device of the engine at its minimum limit.

To this end, the metering device may be set to reach its minimum flow-rate limit, in particular when for a given speed of rotation the current derivative reaches or exceeds the limit derivative.

Alternatively or in addition, at least one engine includes a cock on a fuel pipe, and said engine is automatically shut down by closing the cock.

In addition, each engine is fed with fuel by at least one pump, and each pump is shut down following automatic stopping of the engine.

By way of example, all of the booster pumps arranged in a fuel tank are shut down in order to avoid spreading fuel in the event of a fuel pipe breaking.

In addition, the limit derivative may decrease, possibly linearly, between:

an intermediate value reached for an intermediate speed of rotation, the intermediate speed of rotation referred to as an "intermediate speed"; and a minimum value reached for a maximum acceptable speed of rotation for the power assembly, the maximum acceptable speed of rotation referred to as a "maximum acceptable speed" for said power assembly, the maximum acceptable speed being greater than the intermediate speed, the minimum value being less than the intermediate value.

Consequently, the limit derivative may be close to the operating range authorized by the manufacturer in order to reduce the time required in order to shut down an engine in overspeed.

By way of example, this minimum value is zero.

Furthermore, the engine is possibly not stopped automatically for a speed of rotation that is less than a lower threshold, whatever the current derivative. By way of example, the lower threshold is equal at the intermediate speed described above.

Consequently, the engine is never stopped automatically when the speed of rotation is below the lower threshold. Indeed, the engine is thus located in a normal operating range.

However, beyond this lower threshold, the speed of rotation is located in a range provided by the implemented relationship. The engine may then potentially be stopped, stopping depending at each instant on the comparison of the current derivative with the limit derivative at that instant.

In a phase diagram plotting the speed of rotation along the abscissa axis and the time derivative of said speed of rotation up the ordinate axis, this aspect of the relationship specifying the limit derivative is represented locally by a vertical half-line going away from the abscissa axis starting from an intermediate value of the limit derivative obtained for a speed of rotation that is equal to the lower threshold, the half-line being positioned on an abscissa value that is equal to the lower threshold.

Consequently, a breakdown of the system comparing the current derivative with the limit derivative does not lead to untimely shutting down of the engine under these conditions.

In addition, the engine is stopped automatically for a speed of rotation that is greater than an upper threshold, whatever the current derivative.

In a phase diagram plotting the speed of rotation along the abscissa axis and the time derivative of said speed of rotation up the ordinate axis, this aspect of the relationship specifying the limit derivative is represented by a vertical half-line going away from the abscissa axis starting from a minimum value of the limit derivative obtained for a speed of rotation that is equal to the upper threshold, the half-line being positioned on an abscissa value that is equal to the upper threshold.

Beyond the maximum acceptable speed, the engine is stopped, whatever the value of the current derivative.

Consequently, breakdown of the system comparing the current derivative with the limit derivative does not prevent the engine from being shut down in the event of excessive speed of rotation.

By way of example, the relationship is established for a speed of rotation lying in the range between the intermediate speed and the maximum acceptable speed, the engine not being stopped automatically for a speed of rotation that is less than the intermediate speed, whatever the current derivative, and the engine being stopped automatically for a speed of rotation that is greater than the maximum acceptable speed, whatever the current derivative.

In addition, in a phase diagram plotting the speed of rotation along the abscissa axis and the time derivative of said speed of rotation up the ordinate axis, the relationship specifying the limit derivative relative to the speed of rotation takes the form of a curve that is not parallel to the ordinate axis, said curve splitting the plane of the phase diagram into an authorized sector of operation that does not require the engine to be stopped and into an unauthorized sector of operation that does require the engine to be stopped, said unauthorized sector being located downstream from said curve in the direction of increasing abscissa values, said engine being stopped when an operating point corresponding to the current derivative and to the current speed is located in the unauthorized sector.

In addition to a method, the invention provides an overspeed safety system applying said method.

Thus, the invention provides an overspeed safety system for an engine of a rotorcraft, the engine comprising a gas generator and a power assembly, the power assembly having at least one power turbine set in rotation by the gas generator, the power assembly having at least one power shaft constrained to rotate with the power turbine, the overspeed safety system including a shutdown system for stopping operation of the engine, the overspeed safety system comprising a processor unit connected to the shutdown system.

The overspeed safety system comprises a speed sensor for measuring a speed of rotation of the power assembly, the processor unit being connected to the speed sensor in order to implement the method according to the invention by automatically stopping the engine when the value of the limit derivative corresponding to the current speed is less than or equal to the current derivative.

By way of example, the speed sensor comprises an electromagnetic sensor placed opposite a phonic wheel that is constrained to rotate with the rotary member, the speed of rotation of which it is sought to measure.

Conventionally, a phonic wheel is provided with a peripheral zone comprising teeth distributed circumferentially. The passage of the teeth of the phonic wheel in front of the electromagnetic sensor modifies the magnetic field produced, and induces an AC current in a coil of the electromagnetic sensor having frequency that is proportional to the speed of rotation.

In addition, the shutdown system may comprise a fuel-metering device conveying fuel to the gas generator.

This shutdown system may also comprise at least one pump conveying fuel to the gas generator.

In addition, the processor unit may comprise a logic circuit or equivalent, or calculation means of the processor type or equivalent that execute instructions stored in a memory.

In particular, the processor unit may be a FADEC of the engine. It should be recalled that a FADEC represents the control unit of a turboshaft engine, this control unit being known as "full authority digital engine control".

The processor unit is also advantageously arranged in parallel with the FADEC so as to enable shutting down of an engine in overspeed, even in the event of a FADEC breaking down.

Furthermore, the overspeed safety system may include a shield ring surrounding said power turbine, said power turbine comprising a plurality of blades, each blade being fastened to a fuse member.

The overspeed safety system is then provided with an electronic system automatically stopping the engine if necessary, and a mechanical system of the "blade shedding" type.

In addition to an overspeed safety system, the invention provides a rotorcraft including such a system.

Under such circumstances, the rotorcraft includes at least one rotor, the rotorcraft including at least one engine, the engine driving a power transmission train connected to the rotor.

Furthermore, the rotorcraft includes at least one overspeed safety system of the above-described type, each overspeed safety system being connected to an engine.

By way of example, each engine is associated with an overspeed safety system.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which.

DETAILED DESCRIPTION OF THE INVENTION

Figure 1:
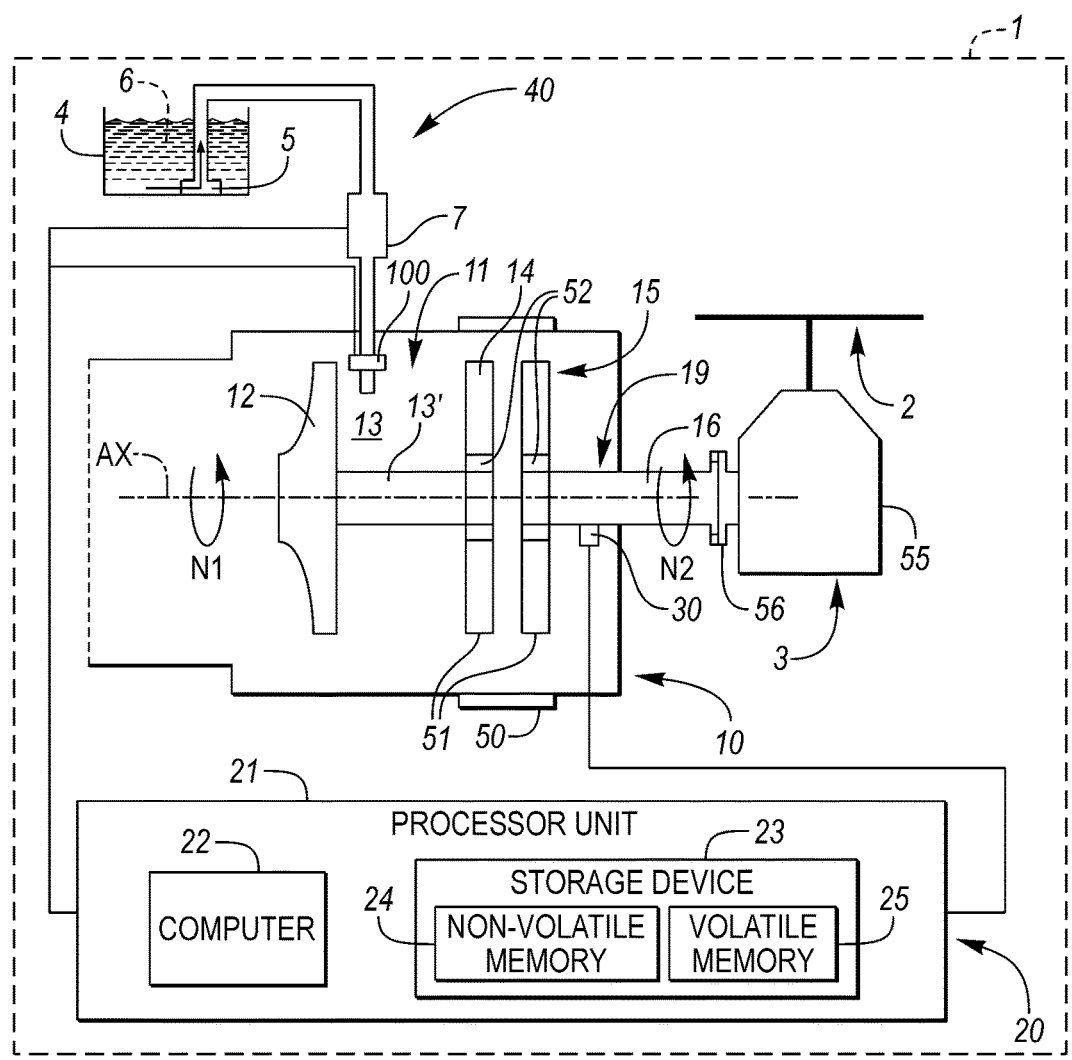
FIG. 1 shows a rotorcraft provided with a single engine.

FIG. 1 shows an aircraft 1, in particular a rotorcraft. The members of the aircraft that are not directly involved in the invention are not shown in the figure in order to avoid overloading the figure pointlessly.

In particular, this aircraft 1 is a rotorcraft including a lift and/or propulsion rotor 2. This rotor 2 is rotated by a power plant including at least one engine 10 and one power drive train 3. Such a power drive train 3 includes for example a free wheel 56 and a main gear box 55. The main gearbox 55 is provided with a mast driving a hub of the rotor 2.

Consequently, at least one engine 10 is mechanically connected to said power drive train 3.

The engine 10 of the rotorcraft is in particular a turboshaft engine.

Consequently, the engine 10 includes a gas generator 11. Conventionally, the gas 11 generator is provided with at least one compressor 12, a combustion chamber 13, and at least one expansion turbine 14. The expansion turbine 14 is connected rigidly to the compressor 12 by a shaft referred to as a "drive shaft 13'".

FIG. 1 shows a single compressor 12 and a single expansion turbine 14. Nevertheless, the number of compressor(s), and expansion turbine(s) may be optimized according to requirements, and does not restrict the ambit of the invention at all.

In addition, the compressor 12, the expansion turbine 14 and the drive shaft 13' are suitable for rotating jointly about a longitudinal axis AX of the engine 10. More precisely, the compressor 12, the expansion turbine 14, and the drive shaft 13' are constrained to rotate together about this longitudinal axis.

The gas generator then rotates at a speed N1, said speed N1 corresponding to the speed of the rotary assembly of the gas generator that comprises the compressor 12 together with the expansion turbine 14 and the drive shaft 13'.

In addition, the turboshaft engine 10 comprises a power assembly 19 located downstream from the gas generator. The power assembly is set in movement by the gas generated by the gas generator.

The power assembly 19 comprises at least one power turbine 15 located downstream from the gas generator. The term "downstream" is to be considered relative to the direction of gas flow within the engine 10.

This power turbine may be connected to the gas generator. However, in FIG. 1, the power turbine is a free turbine that is independent of the gas generator.

Consequently, the power turbine 15 is secured to a power shaft 16 that is connected to the power transmission train 3. Conventionally, the power transmission train 3 is fastened to the power shaft by a member (not shown) for accommodating angular and axial misalignments.

FIG. 1 shows a power assembly 19 including a single power turbine 15. Nevertheless, the number of power turbine(s) may be optimized depending on requirements, and does not restrict the ambit of the invention at all.

The gas leaving the gas generator then sets in rotation the power assembly of the turboshaft engine about the longitudinal axis AX at a speed of rotation N2.

In addition, the rotorcraft comprises at least one tank 4 of fuel 6 for feeding the combustion chamber 13 with fuel.

Consequently, a fuel feed line provided with at least one pump 5 and a metering device 7 connects the tank 4 to the combustion chamber 13. The engine may further comprise a cock 100 on an internal fuel pipe.

The rotorcraft is further provided with an overspeed safety system 20 in order to avoid overspeeding of the engine 10.

This overspeed safety system 20 comprises a processor unit 21.

The processor unit may include a logic circuit or equivalent.

In the variant shown in FIG. 1, the processor unit 21 is for example provided with a storage device 23 and a computer 22. By way of example, the computer may include a processor or the equivalent for executing instructions stored in the storage device for applying the method of the invention. This storage device may include a non-volatile memory 24 storing such instructions and a volatile memory 25 storing parameter values, for example.

The processor unit 21 may be an integral part of a system for controlling a turboshaft engine, such as a system known under the acronym ECU for Engine Control Unit or FADEC for Full Authority Digital Engine Control. Consequently, the computer of the processor unit is the computer of the control system, the storage device being the device for storing said control system.

The processor unit 21 is connected by wire and/or wireless connections to a speed sensor 30. The speed sensor 30 is arranged on the power assembly in order to measure the speed of rotation N2 of said power assembly.

Consequently, the speed sensor 30 transmits a signal conveying the speed of rotation N2 to the processor unit.

In addition, the processor unit 21 is connected to a shutdown system 40 suitable for stopping the engine 10. This shutdown system comprises in particular the metering device 7 feeding the engine 10 and/or the cock 100 with fuel.

Under such circumstances, in the method of the invention, a rotorcraft manufacturer establishes a limit operating relationship prior to flight of the rotorcraft.

Thus, during a development stage, the manufacturer determines a relationship giving a limit time derivative for the speed of rotation N2 of the power assembly. This relationship limits the authorized speed range for the engine 10. For at least one possible range of values for the speed of rotation N2 of the power assembly, the relationship makes it possible to determine a limit value referred to as a "limit derivative".

The term "range" should be understood as a set of values for the speed of rotation N2 extending from a lower limit to an upper limit.

This relationship is then stored in the processor unit 21.

The stored relation ship may take the form of one or more mathematical equations, or indeed a database, for example.

In flight, the processor unit 21 determines whether the engine is in an overspeed condition, and stops said engine 10 automatically if necessary.

To this end, the processor unit 21 performs a series of calculation operations continuously, at a predetermined repetition rate.

During each iteration, the processor unit 21 determines the current speed of the power assembly 19 starting from the signal coming from the speed sensor 30.

The processor unit 21 further deduces the time derivative of said current speed, referred to as the "current derivative".

Furthermore, when the current speed is located within a range of said relationship, the processor unit implements the stored relationship in order to determine whether the current derivative is greater than or equal to the limit derivative obtained from the current speed.

By way of example, the processor unit inputs the current speed value into the stored relationship, and deduces the limit derivative resulting therefrom.

If the current derivative is greater than the limit derivative, the engine 10 is considered as being in an overspeed situation. The processor unit then actuates the shutdown system for stopping the engine 10.

If necessary, each pump 5 is also shut off.

Figure 3:
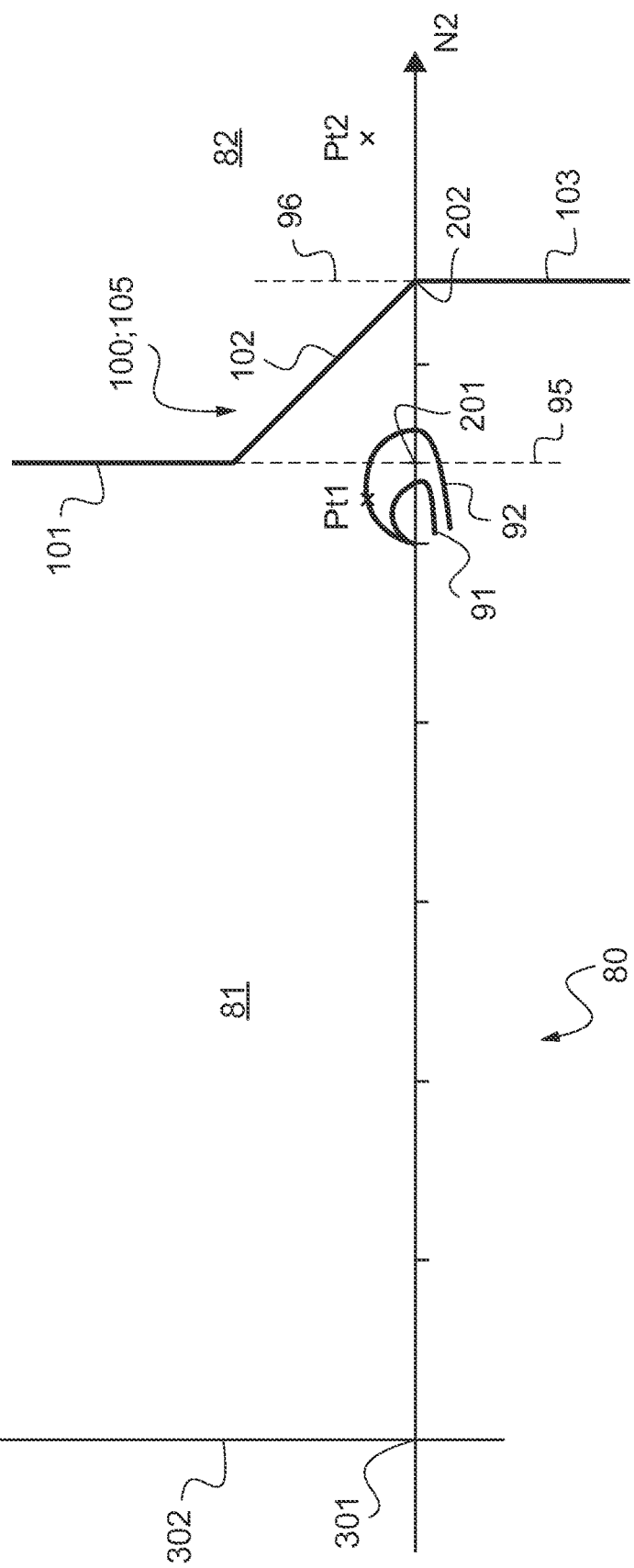
FIG. 3 is a phase diagram explaining the invention.

FIG. 3 illustrates a relationship of the invention by means of a phase diagram 80.

This phase diagram 80 plots the speed of rotation N2 of the power assembly 19 along the abscissa axis. By way of example, this speed of rotation is expressed as a percentage of a nominal speed of rotation. Furthermore, the phase diagram 80 plots the time derivative of said speed of rotation up the ordinate axis.

The relationship providing the speed of rotation limit derivative then takes the form of a curve 100 in this phase diagram 80.

The curve 100 is not parallel to the ordinate axis, unlike a straight line 95 representing a constant speed of rotation. This curve 100 splits the plane of the phase diagram 80 in authorized and unauthorized sectors of operation 81 and 82. The unauthorized sector 82 is located downstream from said curve 100 in the direction of increasing abscissa values. In FIG. 3, the authorized sector 81 is thus located on the left of the curve 100, with the unauthorized sector being located on the right of said curve 100.

Under these conditions, the engine 10 is stopped when an operating point Pt2 corresponding to the current derivative and the current speed is located in the unauthorized sector 82.

Conversely, if the operating point Pt1 is located in the authorized sector 81, the engine is not stopped.

In order to illustrate the advantage of the invention, FIG. 3 plots a first line 91 that shows a tight turn of the rotorcraft.

A second line 92 shows a tight turn performed violently.

If the manufacturer implements a low constant threshold as represented by the first vertical line 95, said constant threshold will give rise to undue stopping of the engine during the violent maneuver as represented by second line 92.

Furthermore, if the manufacturer implements a high constant threshold as represented by a second vertical line 96, stopping of the engine may be late if overspeeding takes place following a stage of flight that induces a speed of rotation N2 that is relatively moderate, e.g. during a turn performed as represented by the first line 91.

The curve 100 illustrating the relationship of the invention aims to avoid undue stopping, while optimizing the stopping of the engine 10 in the event of overspeed.

In the relationship shown in the diagram, the limit derivative decreases linearly along a segment 102 between:

an intermediate value 302 reached for a speed of rotation referred to as an "intermediate speed 201", of the order of 110% of the nominal speed for example; and a minimum value 301 reached for a speed of rotation referred to as a "maximum acceptable speed 202", of the order of 130% of the nominal speed for example.

By way of example, this minimum value 301 is zero. Furthermore, the intermediate value 302 is of the order of 40% of the nominal speed, for example.

It should be remembered that, the lift rotor is driven in rotation at a nominal speed, said nominal speed inducing a nominal speed of rotation of the power assembly known to the person skilled in the art.

By way of example, the relationship takes the following form where "DL" represents said limit derivative and "N2" represents the speed of rotation:

$$DL = \frac{-325}{130} N2 + 325$$

for N2 lying in the range 110% to 130% of the nominal speed.

However, the relationship may take other forms, possibly non-linear forms.

By way of example, the segment 102 could be curved.

The curve 100 thus further presents the form of a half-line 101 extending parallel to the ordinate axis from the intermediate value, and going away from the abscissa axis.

In addition, the curve 100 takes the form of a half-line 103 extending parallel to the ordinate axis from the minimum value, and going away from the abscissa axis.

With reference to FIG. 1, in addition to an electronic system, the overspeed safety system may include a mechanical system of the blade shedding type.

Consequently, each blade 51 of the power turbine 15 may be fastened to a hub by a fuse member 52. This fuse member is dimensioned so as to break in the event of overspeed.

In the example shown, each blade is fastened to the power shaft by a fuse member.

In addition, the overspeed safety system comprises a shield ring 50 for containing the blades inside the engine 10.

The invention applies to a rotorcraft provided with a single engine 10 in accordance with the embodiment of FIG. 1.

Figure 2:
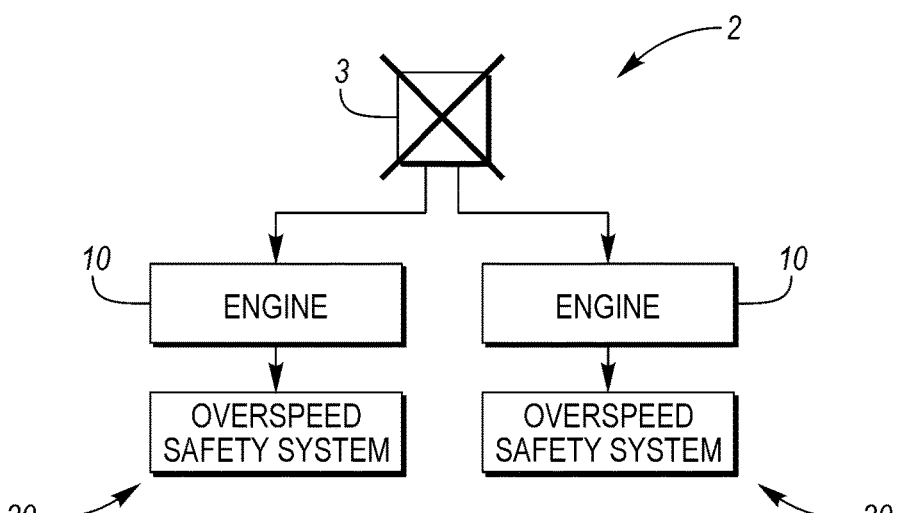
FIG. 2 shows an aircraft provided with two engines.

Nevertheless, the invention also applies to a rotorcraft including a plurality of engines 10 in accordance with the embodiment of FIG. 2.

Consequently, at least one engine 10 is provided with an overspeed safety system 20. Preferably, each engine 10 includes this overspeed safety system 20.

Naturally, the present invention may be subjected to numerous variants as to its implementation. Although several implementations are described, it should readily be understood that it is not conceivable to identify exhaustively all possible implementations. It is naturally possible to envisage replacing any of the means described by equivalent means without going beyond the ambit of the present invention.

By way of example, the processor unit may be independent of the FADEC, possibly being arranged in parallel with said FADEC.

What is claimed is:

1. A method of stopping an engine of a rotorcraft when the engine is in overspeed, the engine including a gas generator and a power assembly, the power assembly having a power turbine set in rotation by gas coming from the gas generator and a power shaft constrained to rotate with the power turbine, the power assembly being rotatable about a longitudinal axis at a speed of rotation, the method comprising:

prior to a flight of the rotorcraft, establishing a relationship that provides a limit derivative threshold over a range of speeds of rotation, the limit derivative threshold according to the relationship having a non-constant value varying over the range of speeds of rotation as a function of speed of rotation values within the range of speeds of rotation; and during a flight of the rotorcraft:
measuring a current speed of rotation of the power assembly;
determining a time derivative of the current speed of rotation, wherein the time derivative of the current speed of rotation is referred to as a current derivative; and
determining that the current speed of rotation is in the range of speeds of rotation specified by the relationship and that the limit derivative threshold corresponding to the current speed of rotation in application of the relationship is less than or equal to the current derivative and automatically stopping the engine in response to the current speed of rotation being in the range of speeds of rotation specified by the relationship and the limit derivative threshold corresponding to the current speed of rotation in application of the relationship being less than or equal to the current derivative.

2. The method according to claim 1, wherein the gas generator is fed by a fuel metering device, the fuel metering device is set between a minimum limit inducing a minimum fuel flow rate and a maximum limit inducing a maximum fuel flow rate, and wherein automatically stopping the engine is performed by setting the fuel metering device of the engine at the minimum limit.

3. The method according to claim 1, wherein the engine includes a cock on a fuel pipe, and wherein automatically stopping the engine is performed by closing the cock.

4. The method according to claim 1, wherein the engine is fed with fuel by a pump, and the pump is shut down following automatic stopping of the engine.

5. The method according to claim 1, wherein the limit derivative threshold decreases between:
an intermediate value reached for an intermediate speed of rotation value; and
a minimum value reached for a maximum acceptable speed of rotation value, the maximum acceptable speed of rotation value being greater than the intermediate speed of rotation value, the minimum value of the limit derivative threshold being less than the intermediate value of the limit derivative threshold.

6. The method according to claim 5, wherein the minimum value of the limit derivative threshold is zero.

7. The method according to claim 5, further comprising not automatically stopping the engine when the speed of rotation is less than the intermediate speed of rotation value, whatever the current derivative.

8. The method according to claim 5, further comprising automatically stopping the engine when the speed of rotation is greater than the maximum acceptable speed of rotation value, whatever the current derivative.

9. The method according to claim 5, wherein the limit derivative threshold decreases linearly between the intermediate value and the minimum value.

10. The method according to claim 1, wherein in a phase diagram plotting the speed of rotation along the abscissa axis and the time derivative of the speed of rotation up the ordinate axis, the relationship providing the limit derivative threshold over the range of speeds of rotation takes the form of a curve that is not parallel to the ordinate axis, the curve splitting the plane of the phase diagram into an authorized sector of operation that does not require the engine to be stopped and an unauthorized sector of operation that does require the engine to be stopped, the unauthorized sector being located downstream from the curve in the direction of increasing abscissa values, the engine to be stopped when an operating point corresponding to the current derivative and to the current speed is located in the unauthorized sector.

11. An overspeed safety system for an engine of a rotorcraft, the engine including a gas generator and a power assembly, the power assembly having a power turbine set in rotation by the gas generator and a power shaft constrained to rotate with the power turbine, the power assembly being rotatable about a longitudinal axis at a speed of rotation, the overspeed safety system comprising:
a shutdown system for stopping operation of the engine;
a processor unit connected to the shutdown system;
a speed sensor for measuring the speed of rotation of the power assembly;
the processor unit being connected to the speed sensor, the processor unit being configured to store a relationship, established prior to a flight of the rotorcraft, that provides a limit derivative threshold over a range of speeds of rotation, the limit derivative threshold according to the relationship having a non-constant value varying over the range of speeds of rotation as a function of speed of rotation values within the range of speeds of rotation; and during a flight of the rotorcraft:
  use the speed sensor to measure a current speed of rotation of the power assembly;
  determine a time derivative of the current speed of rotation, wherein the time derivative of the current speed of rotation is referred to as a current derivative; and
  determine that the current speed of rotation is in the range of speeds of rotation specified by the relationship and that the limit derivative threshold corresponding to the current speed of rotation in application of the relationship is less than or equal to the current derivative and use the shutdown system to automatically stop the engine in response to the current speed of rotation being in the range of speeds of rotation specified by the relationship and the limit derivative threshold corresponding to the current speed of rotation in application of the relationship being less than or equal to the current derivative.

12. The overspeed safety system according to claim 11, wherein the shutdown system includes a fuel-metering device conveying fuel to the gas generator.

13. The overspeed safety system according to claim 11, wherein the shutdown system includes a pump conveying fuel to the gas generator.

14. The overspeed safety system according to claim 11 further comprising a shield ring surrounding the power turbine, the power turbine further having a plurality of blades, each blade being fastened to a fuse member.

15. The overspeed safety system according to claim 11, wherein the processor unit is a full authority digital engine controller (FADEC) of the engine.

16. A rotorcraft comprising a rotor and at least one engine, each engine of the at least one engine driving a power transmission train connected to the rotor, wherein the rotorcraft further includes at least one overspeed safety system according to claim 11, each overspeed safety system of the at least one overspeed system being connected to an engine of the at least one engine.

* * * * *